United States Patent [19]

Hall et al.

[11] Patent Number: 5,737,020
[45] Date of Patent: Apr. 7, 1998

[54] ADAPTIVE FIELD/FRAME ENCODING OF DISCRETE COSINE TRANSFORM

[75] Inventors: Barbara Ann Hall; Agnes Yee Ngai, both of Endwell; John Michael Sutton, Endicott, all of N.Y.

[73] Assignee: International Business Machines Corporation, Armonk, N.Y.

[21] Appl. No.: 779,541

[22] Filed: Jan. 7, 1997

Related U.S. Application Data

[63] Continuation of Ser. No. 411,126, Mar. 27, 1995, abandoned.

[51] Int. Cl.$^6$ ...................................................... H04N 7/30
[52] U.S. Cl. ........................... 348/403; 348/420; 382/250
[58] Field of Search ................................. 348/384, 390, 348/400–403, 405, 407, 409–413, 415, 416, 420, 699; 382/232, 236, 238, 248–250; H04N 7/133

[56] References Cited

U.S. PATENT DOCUMENTS

| | | | |
|---|---|---|---|
| 4,546,386 | 10/1985 | Matsumoto et al. | 348/412 |
| 4,571,618 | 2/1986 | Hatori et al. | 348/412 |
| 4,999,705 | 3/1991 | Puri . | |
| 5,001,561 | 3/1991 | Haskell et al. . | |
| 5,091,782 | 2/1992 | Krause et al. . | |
| 5,168,357 | 12/1992 | Kutka | 348/403 |
| 5,175,618 | 12/1992 | Ueda et al. | 348/416 |
| 5,227,878 | 7/1993 | Puri et al. . | |
| 5,317,397 | 5/1994 | Odaka et al. | 348/699 |
| 5,367,629 | 11/1994 | Chu et al. | 395/162 |
| 5,412,435 | 5/1995 | Nakajima | 348/699 |
| 5,526,054 | 6/1996 | Greenfield et al. | 348/403 |

OTHER PUBLICATIONS

MPEG; A Video Compression Standard for Multimedia Applications; Gall; Apr. 1991, vol. 34, No. 4 Communications of the ACM, pp. 47–58.

Encoding of motion video sequences for the MPEG environment using arithmetic coding; Viscito, Gonzales; SPIE vol. 1360 Visual Communications and Image Processing '90, pp. 1572–1576.

The MPEG video compression algorithm; Le Gall; Elsevier Science Publishers B.V. vol. 4, No. 2 Apr. 1992, pp. 129–138.

C–Cube MPEG Video Processor; Purcell, Galbi; SPIE; vol. 1659, 1992, pp. 24–29.

Motion Video Adaptive Quantization In the Transfor; Gonzales, Viscito; IEEE Trans Circuits System Video Technology, vol. 1, Dec. 4, 1991; pp. 374–378.

*Primary Examiner*—Richard Lee
*Attorney, Agent, or Firm*—Richard M. Goldman

[57] ABSTRACT

A method of Discrete Cosine Transform compression of a digital video image. In the method the Field Variance and Frame Variance are calculated. When the Field Variance is less than the Frame Variance, Field Discrete Cosine Transform type compression is performed. Alternatively, when the Frame Variance is less than the Field Variance, then a Frame Discrete Cosine Transform compression is performed.

1 Claim, 4 Drawing Sheets

ADAPTIVE FIELD/FRAME ENCODING OF DISCRETE COSINE TRANSFORM

This application is a continuation of application Ser. No. 08/411,126, filed Mar. 27, 1995, now abandoned.

FIELD OF THE INVENTION

This invention relates to video encoders, especially video encoders intended to encode and further compress video signals, e.g., discrete cosine transform encoded video signals. The invention relates especially to dynamically partitionable digital video processors for digital video signal encoding. A dynamically partitionable digital video processor, as used herein, means a processor that can function as an n unit processor, e.g., a four byte wide processor, and as n 1-unit processors, e.g., as four one-byte wide processors. The method, apparatus, and system of the invention are useful compressing video signals, as in encoding broadcast signals, cablecast signals, and digital network signals, as well as in high definition television, interactive television, multimedia, video on demand, video conferencing, and digital video recording.

BACKGROUND OF THE INVENTION

The Moving Picture Experts' Group (MPEG) MPEG-2 Draft Standard is a compression/decompression standard for digital video applications. The standard describes an encoding method that results in substantial bandwidth reduction by a subjective lossy compression followed by a lossless compression. The encoded, compressed digital video data is subsequently decompressed and decoded in an MPEG-2 Draft Standard compliant decoder.

The MPEG-2 Draft Standard is described in, e.g., C. A. Gonzales and E. Viscito, "Motion Video Adaptive Quantization In The Transform Domain," *IEEE Trans Circuits Syst Video Technol*, Volume 1, No. 4, December 1991, pp. 374–378, E. Viscito and C. A. Gonzales, "Encoding of Motion Video Sequences for the MPEG Environment Using Arithmetic Coding," *SPIE*, Vol. 1360, pp. 1572–1576, (1990), D. LeGall, "MPEG: A Video Compression Standard for Multimedia Applications," *Communications of the ACM*, Vol. 34, No. 4, (April 1991), pp. 46–58, S. Purcell and D. Galbi, "C Cube MPEG Video Processor," *SPIE*, v. 1659, (1992) pp. 24–29, and D. J. LeGall, "MPEG Video Compression Algorithm," *Signal Process Image Commun*, v. 4, n. 2, (1992), pp. 129–140, among others.

The MPEG-2 Draft Standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 Draft Standard result in a balance between intraframe encoding alone and interframe encoding alone.

The MPEG-2 Draft Standard exploits temporal redundancy for motion compensated interpolative and predictive encoding. That is, the assumption is made that "locally" the current picture can be modelled as a translation of the picture at a previous and/or future time. "Locally" means that the amplitude and direction of the displacement are not the same everywhere in the picture.

MPEG-2 Draft Standard specifies predictive and interpolative interframe encoding and frequency domain intraframe encoding. It has block based motion compensation for the reduction of temporal redundancy, and Discrete Cosine Transform based compression for the reduction of spatial redundancy. Under MPEG-2 Draft Standard motion compensation is achieved by predictive coding, interpolative coding, and Variable Length Coded motion vectors. The information relative to motion is based on 16×16 blocks and is transmitted with the spatial information. It is compressed with Variable Length Codes, such as Huffman codes.

Figure 1:
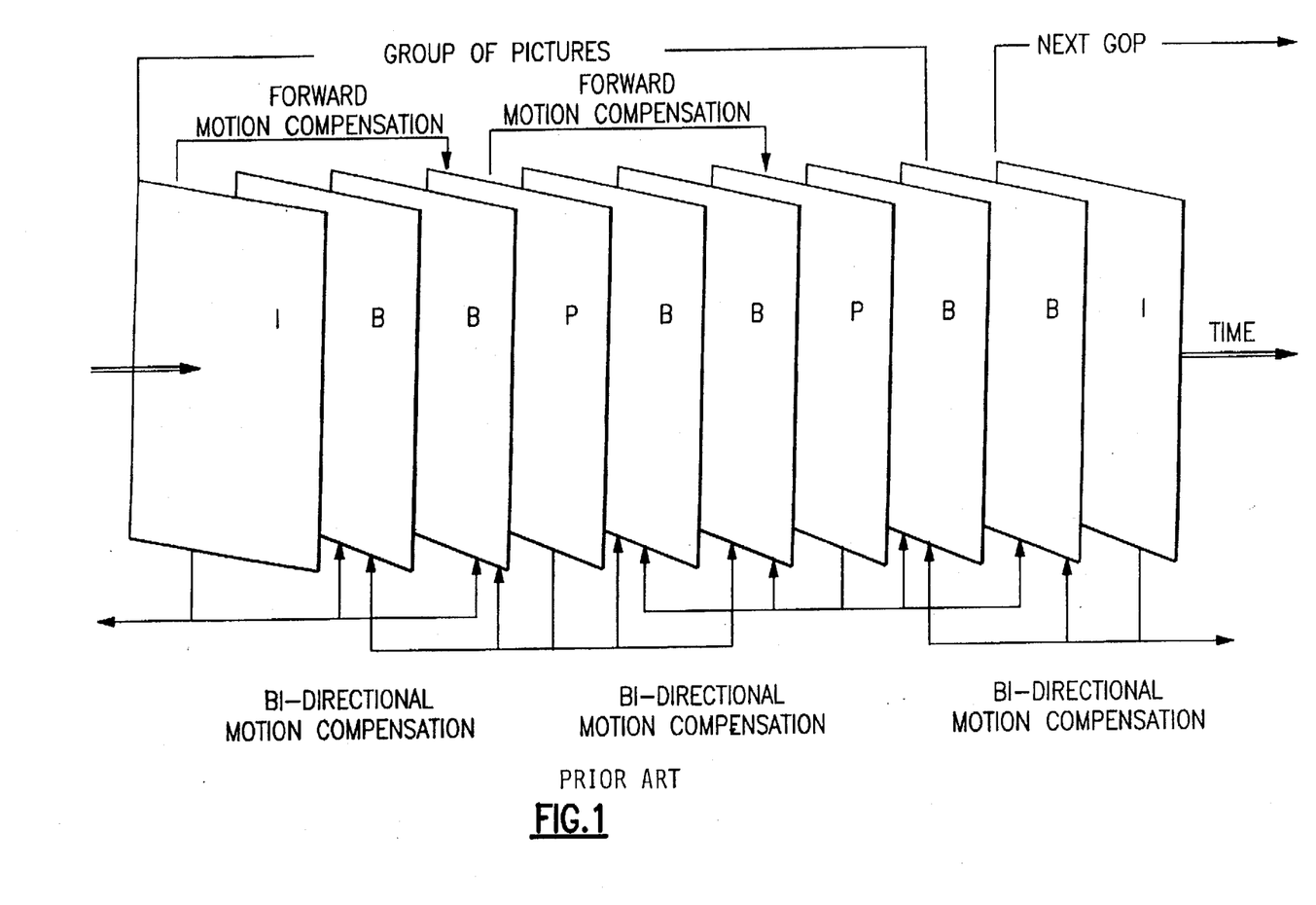
FIG. 1 shows the relationship of the Intraframe, the Predicted Frames, and the Bidirectional Frames to form a Group of Pictures.

The MPEG-2 Draft Standard provides temporal redundancy reduction through the use of various predictive and interpolative tools. This is illustrated in FIG. 1. FIG. 1 shows three types of frames or pictures, "I" Intrapictures, "P" Predicted Pictures, and "B" Bidirectional Interpolated Pictures.

The "I" Intrapictures provide moderate compression, and are access points for random access, e.g., in the case of video tapes or CD ROMS. As a matter of convenience, one "I" Intrapicture is provided approximately every half second. The "I" Intrapicture only gets information from itself. It does not receive information from any "P" Predicted Pictures or "B" Bidirectional Interpolated Pictures. Scene cuts preferably occur at "I" Intrapictures.

"P" Predicted Pictures are coded with respect to a previous picture. "P" Predicted Pictures are used as the reference for future pictures, both "P" and "B" pictures.

"B" Bidirectional Coded pictures have the highest degree of compression. They require both a past picture and a future picture for reconstruction. "B" bidirectional pictures are never used as a reference.

Motion compensation goes to the redundancy between pictures. The formation of "P" Predicted Pictures from "I" Intrapictures and of "B" Bidirectional Coded Pictures from a pair of past and future pictures is a key feature of the MPEG-2 Draft Standard technique.

The motion compensation unit under the MPEG-2 Draft Standard is the Macroblock unit. The MPEG-2 Draft Standard Macroblocks are 16×16 pixel macroblocks. Motion information consists of one vector for forward predicted macroblocks, one vector for backward predicted macroblocks, and two vectors for bidirectionally predicted macroblocks. The motion information associated with each 16×16 macroblock is coded differentially with respect to the motion information present in the reference macroblock. In this way a 16×16 macroblock of pixels is predicted by a translation of a 16×16 macroblock of pixels from a past or future picture.

The difference between the source pixels and the predicted pixels is included in the corresponding bit stream. The decoder adds the correction term to the block of predicted pixels to produce the reconstructed block.

As described above and illustrated in FIG. 1, each 16×16 pixel block of a "P" Predicted Picture can be coded with respect to the closest previous "I" Intrapicture, or with respect to the closest previous "P" Predicted Picture.

Further, as described above and illustrated in FIG. 1, each 16×16 pixel block of a "B" Bidirectional Picture can be coded by forward prediction from the closest past "I" or "P" Picture, by backward prediction from the closest future "I" or "P" Picture, or bidirectionally, using both the closest past "I" or "P" picture and the closest future "I" or "P" picture. Full bidirectional prediction is the least noisy prediction.

Motion information is sent with each 16×16 pixel block to show what part of the reference picture is to be used as a predictor.

As noted above, motion vectors are coded differentially with respect to motion vectors of the previous adjacent block. Variable Length Coding is used to code the differential motion vector so that only a small number of bits are needed to code the motion vector in the common case, where the motion vector for a block is nearly equal to the motion vector for a preceding block.

Spatial redundancy is the redundancy within a picture. Because of the block based nature of the motion compensation process, described above, it was desirable for the MPEG-2 Draft Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

Figure 2:
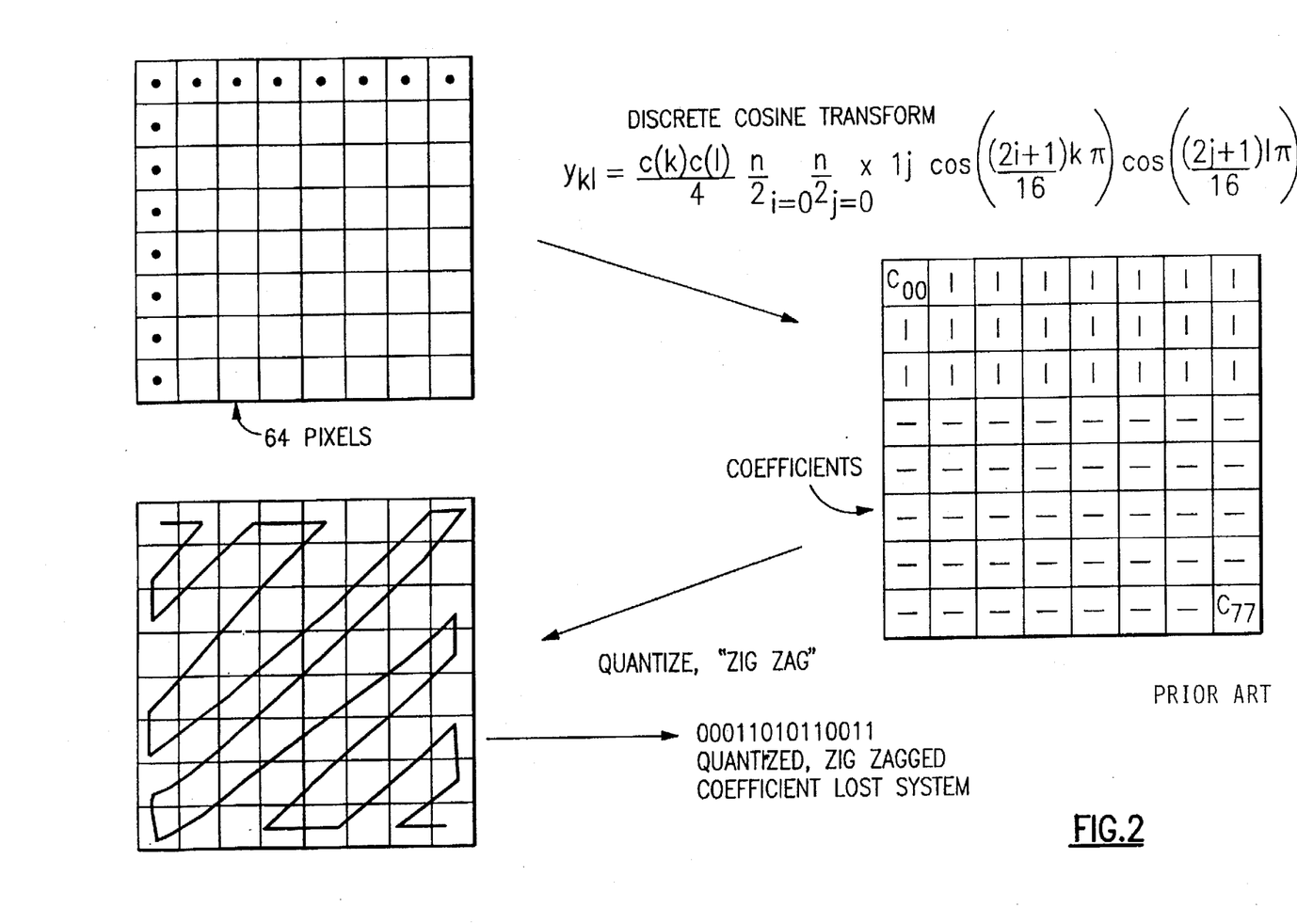
FIG. 2 is a flow chart of three stages of discrete cosine transform encoding.

After transformation, many of the frequency coefficients are zero, especially the coefficients for high spatial frequencies. These coefficients are organized into a zig-zag, as shown in FIG. 2, and converted into run-amplitude (run-level) pairs. Each pair indicates the number of zero coefficients and the amplitude of the non-zero coefficient. This is coded in a Variable Length Code.

Discrete Cosine Transformation encoding is carried out in the three stages as shown in FIG. 2. The first stage is the computation of the Discrete Cosine Transformation coefficients. The second step is the quantization of the coefficients. The third step is the conversion of the quantized transform coefficients into {run-amplitude} pairs after reorganization of the data into zig-zag scanning order.

Quantization enables very high degrees of compression, and a high output bit rate, and retains high picture quality.

Quantization can be adaptive, with "I" Intrapictures having fine quantization to avoid "blocking." This is important because "I" Intrapictures contain energy at all frequencies. By way of contrast, "P" and "B" pictures contain predominantly high frequency energy and can be coded at a coarser quantization.

The MPEG-2 Draft Standard specifies a layered structure of syntax and bit stream. The bit stream is separated into logically distinct entities to prevent ambiguities and facilitate decoding. The six layers are shown in Table 1, below

TABLE 1

MPEG-2 Draft Standard Layers

| Layer | Purpose |
| --- | --- |
| Sequence Layer | Random Access Unit and Context |
| Group of Pictures Layer | Random Access Unit and Video Coding |
| Picture Layer | Primary Coding Unit |
| Slice Layer | Resynchronization Unit |
| Macroblock Layer | Motion Compensation Unit |
| Block Layer | DCT Unit |

Encoding can be accomplished by hardware or by software. Hardware encoding is generally faster than software encoding. However, even hardware encoding is slow, given the bit rate of a video image and the narrow bandwidth of the transmission medium. One reason for this is the many steps required in forming the Discrete Cosine Transform, and calculating all of its coefficients.

OBJECTS OF THE INVENTION

It is one object of the invention to provide a system that increases the speed of the encoding process, especially the Discrete Cosine Transform encoding process.

It is still another object of the invention to reduce the clock cycles required for encoding a picture.

SUMMARY OF THE INVENTION

These and other objects of the invention are attained by the digital signal encoder system of the invention. The system is useful for receiving the pre-processed, partially encoded but uncompressed macroblock and forming the discrete cosine transform thereof. The processor of the invention works in conjunction with other elements of the encoder system including a quantizer, a variable length code encoder, and a FIFO data output buffer to provide an integrated system.

The processor of the invention is utilized in a digital video encoder processor for discrete cosine transform encoding. The discrete cosine transform encoding includes the encoding steps of (1) determining the discrete cosine transform field or frame type, (2) addressing individual pixels as either (i) vertically adjacent pixels on consecutive Odd and Even field lines, or (ii) vertically adjacent pixels on consecutive Odd field lines, then consecutive Even field lines; or (iii) vertically adjacent pixels on consecutive Even field lines, then consecutive Odd field lines. These subtractions may be performed between (i) consecutive lines, (ii) odd lines, or (iii) even lines. The next step is finding the smallest variance of the above subtractions to determine the discrete cosine transform coding type. The subtractions are carried out in a dynamically partitionable processor having a plurality of datapaths. The datapaths are partitionable by the action of running opcode into (i) a single wide datapath, and (ii) a plurality of narrow datapaths for calculating the absolute value of the difference between two pixels, and accumulating the results of the subtraction.

According to a further exemplification of the invention there is provided a method of memory management in a digital image encoder to minimize memory bandwidth demands during encoding. The method is used with motion video data having temporal and spatial redundancy where chrominance and luminance data are stored temporarily. According to the method disclosed chrominance and luminance data are stored in separate locations in memory. The luminance data is fetched from memory and is the only image data used for motion estimation. The chrominance data is fetched from memory in a chrominance-luminance pair for image reconstruction. The reconstructed image is stored in memory, and fetched from memory for motion estimation.

According to a still further exemplification of the invention there is provided a method of encoding digital video image data having luminance and chrominance components, where the chrominance components are encoded at one quarter the spatial resolution of the luminance components.

And, according to a still further embodiment of our invention, there is provided a method of Discrete Cosine Transformation of a digital video image. In the disclosed method the Field Variance and Frame Variance are calculated. When the Field Variance is less than the Frame Variance Field Discrete Cosine Transform type transformation is performed. Alternatively, when the Frame Variance is less then the Field Variance, than a Frame Discrete Cosine Transform transformation is performed.

According to a still further embodiment of our invention, there is provided a method for encoding bitstream headers where templates for the bitstream header are stored in a buffer. The templates being addressable by programmable instructions, and the processor has a status register containing a bit for each header type. The status register is modifiable during the encoding process with a data pattern indicating the headers needed for encoding with the bitstream. In this way when a bit is set to 1 the predefined header type is generated and shipped to the bitstream, the header being generated by processing the header buffer template entries associated with the header type.

According to a still further embodiment of our invention, there is provided a method of encoding a low frame rate digital video source image to a high frame rate digital video target image in an encoder, where repeat fields are introduced into a high frame rate digital video intermediate image.

DETAILED DESCRIPTION OF THE INVENTION

Every pixel in a digital video picture is represented by 1 byte of luminance and 1 byte of chrominance information. This is specified in the 4:2:2 MPEG standard. With a maximum picture size of 720 by 480 pixels and a transmission rate of 30 pictures per second, storage of the video image requires a large amount of memory. Moreover, a high bandwidth is required to transmit a video image across a transmission medium. Digital video compression is introduced to lower the memory and transmission medium bandwidth requirements. The end result of compression is a digital video image with less data bytes than the original picture but with as much information as possible.

The Processor

One step in video compression is to determine the quantization value per segment of the picture. The concept of quantization is to reduce the value of each pixel in the segment by a stepsize so that as many zeros as possible are created. In general, as the result of subsequent compression and encoding techniques, zeros require less data bits to represent. The value of the quantization factor or constant is selected based upon a human vision model. The selection of the quantization value requires computation that involves every pixel in the segment. There are 256 bytes of luminance data per macroblock in the 4:2:2 MPEG standard. To involve every pixel would require 256 operations. To speed up the computation, the operations are carried out in parallel.

Figure 3:
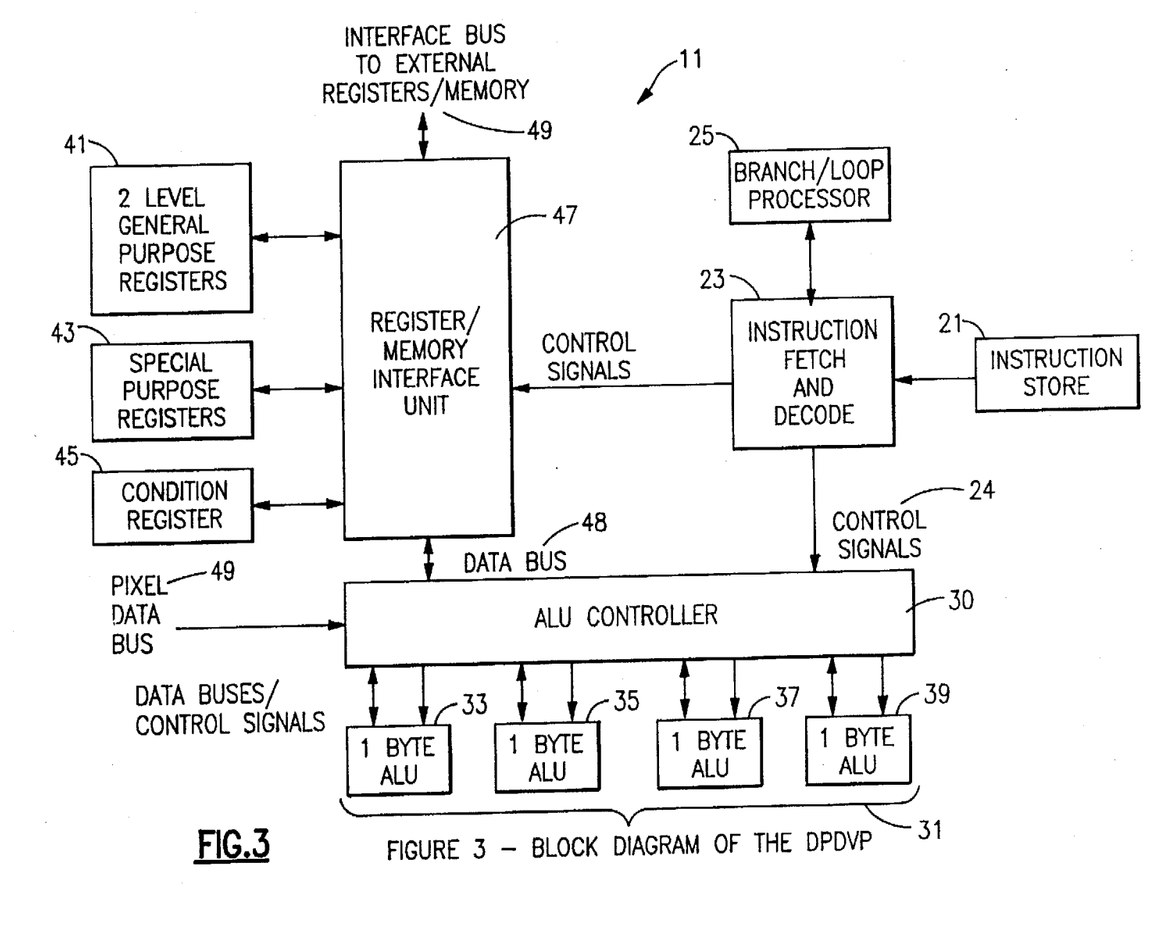
FIG. 3 is a block diagram of the dynamically partitionable digital video encoder processor of the invention.

The processor 11 of the invention has an instruction store 21 where microcode is stored. The processor 11 has a four byte wide arithmetic and logical unit 31 that is comprised of four one byte ALU's, 33, 35, 37, and 39. The processor 11 has a two level set of general purpose working registers, 41, a group of special purpose registers, 43, an instruction address stack, and a condition register, 45.

The processor 31 can perform four byte wide arithmetic and logical operations in the pipelines ALU 31. The pipelined ALU, 31, is made up of four individual one byte ALUs, 33, 35, 37, and 39. These four specialized arithmetic and logical units, ALUs, 33, 35, 37, and 39, are the core of the arithmetic and logic operations. Processor operations occur in four pipelined cycles:

1. FETCH,
2. DECODE,
3. EXECUTE, and
4. WRITE BACK.

Microcode instructions are first fetched from the instruction store, 21, and then decoded. The ALU controller, 30, provides data/control signals from the register/memory interface unit, 47, and the instruction fetch/decode unit, 23, respectively, through the ALU control unit, 30, to the ALUs, 33, 35, 37, and 39, based on the decoded instruction and the results of the previous instructions for data pipelining.

The processor, 11, can operate on either register/memory data from the register/memory interface unit, 47, or pixel data sent to the processor, 11, on dedicated pixel buses, 49. Branch/loop instructions are performed by a separate branch/loop processor unit, 25.

Data is processed by the ALUs, 33, 35, 37, and 39, in the EXECUTE cycle and stored to registers/memory, 41, 43, and 45, during the WRITE BACK cycle through the register/memory interface unit, 47. The processor, 11, can access a two level set of general purpose working registers, 41, and a group of special purpose registers, 43, internal to the processor, 11. A pixel bus, 49, is also provided for access to the registers/memory from external sources. A block diagram of the processor, 11, is shown in FIG. 3.

Each instruction is 27 bits wide. There are several instruction formats defined for this processor. A typical instruction has an opcode, a mode bit, destination field, and 2 source fields. The opcode is used to indicate what function is to be performed by the processor.

The mode bit tells the processor how to operate on the instruction. The two modes are "UNI" and "LP". "UNI" mode operates as one four byte operation. While "LP" mode (LOGICAL PARTITION) operates as four one byte operations independent of each other. The source fields specify the location of the inputs to the operations. The destination field specifies the location to store the result of the operations.

The arithmetic and logical function unit, 31, consists of four 1 byte standalone arithmetic and logical units (ALUs), 33, 35, 37, and 39. The carry out of the high order bit of each unit propagates to the next higher order unit if the instruction specifies a 4 byte operation.

In each arithmetic and logical unit, there is an accumulation function. The accumulator per ALU is 16 bits wide. An add accumulate instruction is architected that permits the accumulation of the addition results with the previous data in the accumulator. The add circuitry allows two 8 bit inputs to be added to a 16 bit accumulator. This function permits accumulation of up to 256 bits of input data.

There are eight 8 by 8 multipliers installed in the processor, two per ALU. A 32 by 32 multiplication operation is also architected into the processor.

A subset of the 32 by 32 multiplication is the 32 by 16 multiplication. Two 8 by 8 multipliers in each unit are joined to form an 8 by 16 multiplier. In addition the two 8 by 16 multipliers of adjacent units are joined to form a single 16 by 16 multiplier. The input operands are parsed to allow H×L and L×L multiplications. The result of the two 16 by 16 multiplications are combined to form the 32 by 16 multiplication. This design allows the maximum reuse of circuitry.

One compression technique employed in MPEG2 is Discrete Cosine Transform (DCT) coding. This process is used to convert spatial domain image data into frequency domain image data. The picture image is fed to the DCT process in small subset of 8 by 8 pixels. An 8×8 block of pixels is defined as a macroblock.

If consecutive lines of pixels are used to feed the DCT process, this technique is defined as frame DCT type. Alternatively, if every other line of pixel image data is concatenated to form the 8 by 8 DCT input then this technique is defined as field DCT type. In general if there is motion between the two fields of a picture, as often occurs in interlaced pictures, then the pixel data has large differences between consecutive lines. If there is no motion between fields then there is very little variance between consecutive lines of pixel data. Typically the lower the pixel variance the higher the compression efficiency that can be achieved.

The encoder determines the DCT type, e.g. field or frame, by calculating the variances of the input pixel image. The input is fetched according to the address modes set by the set addressing mode instruction. This instruction sets one of the 6 unique address modes. 'Mode 1' will address two vertically adjacent pixels on consecutive Odd and Even field lines in the macroblock. 'Mode 2' will first address two vertically adjacent pixels on consecutive Odd field lines, then switch to consecutive Even field lines. 'Mode 3' will first address two vertically adjacent pixels on consecutive Even field lines, then switch to consecutive Odd field lines. Modes 4, 5, and 6 are identical to Modes 1,2, and 3 respectively, expect that one pixel in each of the Odd or Even lines of the macroblock is addressed, instead of two. The one pixel addressing modes are not used in the DCT type calculation.

Figure 4:
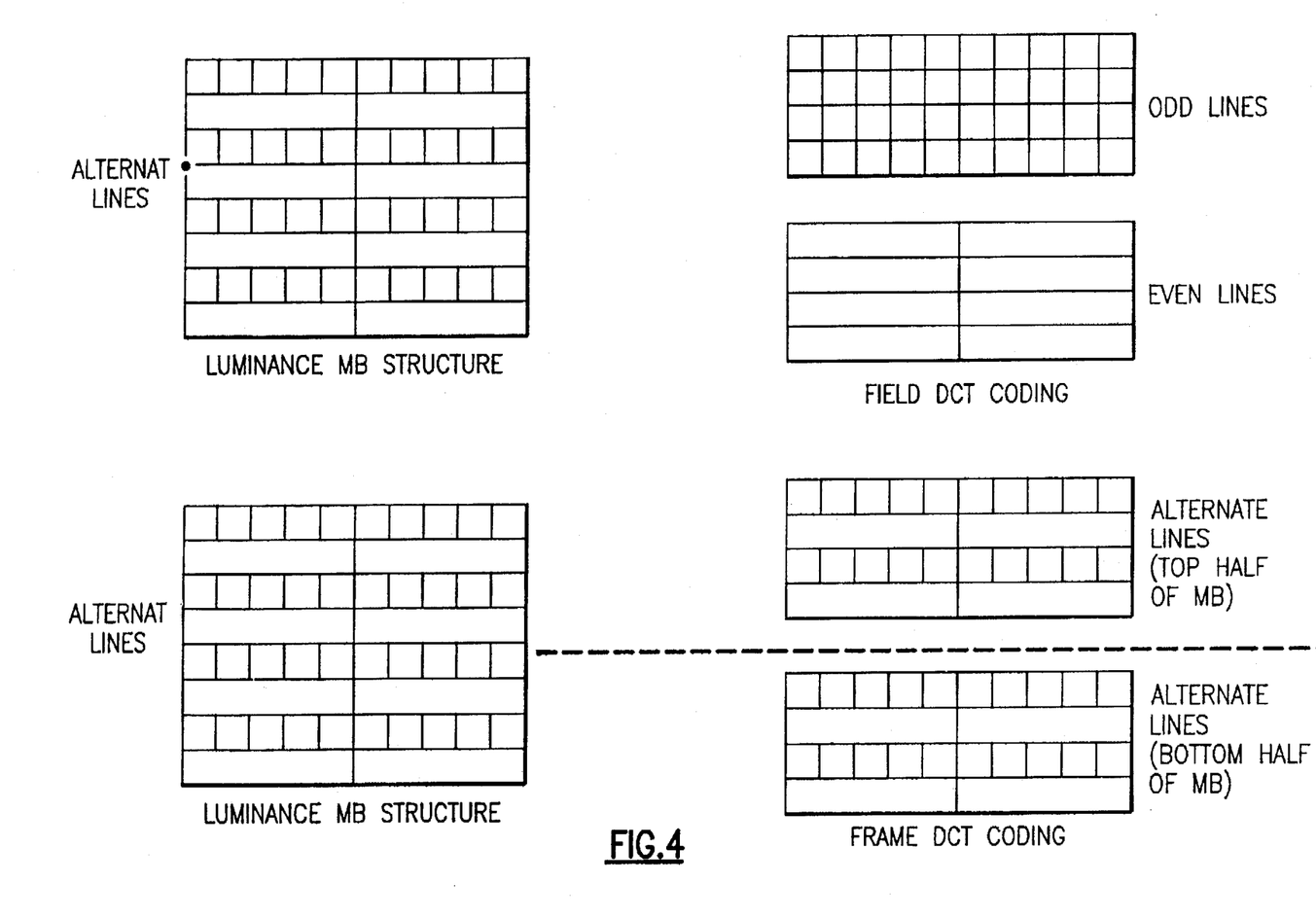
FIG. 4 shows the subtraction of pixels, e.g., between consecutive lines, between odd lines, and between even lines.

The DCT type calculation involves three different subtractions: subtraction between consecutive lines, subtraction between the odd lines and subtraction between the even lines as shown in FIG. 4.

The smallest variance of the above subtractions is used to determine the DCT coding type. This pixel variance calculation is computation intensive involving every pixel. There are 256 pixels every macroblock, requiring 128 subtractions and 128 additions for the frame DCT calculation, and another 128 subtractions and 128 additions for the field DCT calculation. In a final step, the totals of the four accumulated values are added using an accumlator sum instruction, ACCSUM. A compare instruction is needed to determine which variance is smaller frame DCT or field DCT. In processors used heretofore this decision will require 512 calculations. In the processor of the instant invention, the mode bit is used to specify 4 calculations to be carried out in one cycle. The number of cycles required to perform this calculation is improved by a factor of four, resulting in one hundred twenty eight cycles required to perform the calculation. With the combination of the subtract absolute (SUBABS) and add accumulator (ADDACC) instructions, only 64 cycles are required.

Only two instructions are needed to calculate the variances. The instructions are SUBABS and ADDACC. These two instructions form a subroutine and are looped until all pixels in the macroblock have been used. The loop is used once for the frame DCT calculation and once again for the field DCT calculation. The SUBABS instruction is used to calculate the absolute value of the difference between two pixels. The ADDACC instruction is used to accumulate the results of the SUBABS instruction.

By pipelining the result of the SUBABS into the input of the ADDACC, intermediate memory read or write instructions are not needed. In this mode of operation, the above instructions improve performance by reducing the cycles required per calculation.

The processor, 11, of the invention is utilized in a digital video encoder processor for discrete cosine transform encoding. The discrete cosine transform encoding includes the encoding steps of (1) determining the discrete cosine transform field or frame type, (2) addressing individual pixels as either (i) vertically adjacent pixels on consecutive Odd and Even field lines, or (ii) vertically adjacent pixels on consecutive Odd field lines, then consecutive Even field lines; or (iii) vertically adjacent pixels on consecutive Even field lines, then consecutive Odd field lines. These subtractions may be performed between (i) consecutive lines, (ii) odd lines, or (iii) even lines. The next step is finding the smallest variance of the above subtractions to determine the discrete cosine transform coding type. The subtractions are carried out in a dynamically partitionable processor having a plurality of datapaths, 33, 35, 37, 39. The datapaths 33, 35, 37, 39, are partitionable by the action of running opcode into (i) a single wide datapath, 31, and (ii) a plurality of narrow datapaths, 33, 35, 37, 39, for calculating the absolute value of the difference between two pixels, and accumulating the results of the subtraction.

Another compression technique following calculation of the DCT coefficients is quantization. Quantization is a process to determine the stepsize per macroblock. Stepsize is based on the light intensity variances of the macroblock. The average of intensity of the macroblock is first calculated. Variances of each block are then determined. The smallest variance is used to select the stepsize for the macroblock. In the processor described herein, the average intensity can be calculated by ADDACC and shift instructions. The ADDACC instruction forms a subroutine of one instruction and is looped until all of the pixels in the 8 by 8 block are used. The accumulated result is divided by 64 via a shift right instruction.

The LP mode option is used for performance improvement. The addition of all luminance pixels is performed by the four ALUs, 33, 35, 37, and 39, in parallel. The average of each group is then calculated by performing a SHIFT RIGHT on the result.

The variance intensity is calculated by the SUBABS and ADDACC instructions. The SUBABS is used to determine the difference of each pixel data from the average of the block. ADDACC is used to accumulate the differences in each block. The smallest accumulation among the four blocks is used to determine the stepsize of the macroblock. By choosing LP mode, the computation of the four blocks is carried out simultaneously.

The architecture of the instructions in the processor, 11, and the execution unit design allows the dynamic partition of a single four byte dataflow to operate as one four byte dataflow unit or as four one byte execution units. The dynamic partitionable capability enhances the processor output, thereby providing a system that increases the speed of the encoding process, especially the Discrete Cosine Transform encoding process, and reducing the clock cycles required for encoding a picture.

Method and Apparatus for Color Conversion

The MPEG 2 standard specifies that the video input source is either 422 or 420 format. In the YUV color space, most of the high frequency components are concentrated in the Y component. However, human visual acuity is lowest in the high frquency chrominance components, and highest in the low frequency luminance components. For this resaon, high compression of video sources can be obtained if the video sources are compressed from RGB to 422 or 420 color format. The color conversion to 420 requires reduction in both the horizontal and vertical dimensions, producing chrominance components that are one quarter the spatial resolution of the luminance components.

In progressive video, there is no motion between fields. A linear filter can be used to reduce the chrominace components. In interlaced full motion video, there is time difference, and thus motion between two fields in a frame structure picture. Because the chrominance components of two adjacent fields are very uncorrelated, a linear filter will create artifacts. Therefore motion compensation must be considered in the chrominance reduction.

Only the chrominance components of one field are used in the invention described herein. One field of chrominance information is applied to both luminance fields. No chrominance motion compensation is needed in this method. By eliminating one field, the vertical components are also reduced. Since all horizontal components of a field are within the time interval, there is no motion and a linear filter is used to reduce the horizontal components.

Color reduction is achieved by this economical filter and enhances video compression.

Field and Frame Encoding

One form of image compression is achieved by removal of redundant data called spatial redundancies. This form of redundancy occurs due to correlated information between adjacent pixel data.

In interlaced full motion video, there is a time difference between fields and thus there is motion between adjacent fields. This motion creates a discontinuity between adjacent lines within a frame.

The MPEG2 standard allows the use of Field and Frame Discrete Cosine Transform types to achieve better compression. Frame processing works better when there is little or no motion. There are more lines in the Frame format, thus there is more correlation for increased compressibility. However Field format processing works better in vertical detail motion. In such cases the field data is more correlated than the frame data.

The Discrete Cosine Transform Type decision, i.e., the Field or Frame decision, is calculated for every macroblock. The encoding method of the invention is based on the observation that if the two fields of the picture are from different times, then the data between the adjacent lines within a field will generally be closer in value than the data of adjacent lines within the frame.

The encoder calculates the total differences between adjacent lines of the Frame structure of the macroblock and then of adjacent lines of a Field structure within the macroblock. If the Field total variance is less, then Field Discrete Cosine Transform type is chosen. If however, the Frame total variance is less, then a Frame Discrete Cosine Transform type is chosen.

The Frame variance is calculated by the summation of the absolute differences between adjacent lines in the frame structure. It is assumed the lines in the frame structure are numbered in ascending order such as 1,2,3 etc. The Frame variance is the summation of the absolute differences of line 1 and 2, line 3 and 4, etc.

The Field variance is calculated in two parts: Field1 variance and Field2 variance. Field1 variance is the summation of the absolute differences between adjacent odd lines in the frame structure. With the same numbering scheme as above, the Field1 variance is the summation of the absolute differences of line 1 and 3, line 5 and 7, etc. Field2 variance is calculated in the similar fashion with the exception the even line numbers are used. Field2 variance is the summation of the absolute differences of line 2 and 4, line 6 and 8, etc.

If the frame variance is less than Field1 variance plus Field2 variance, as above, then Frame Discrete Cosine Transform is chosen. Otherwise the Field Discrete Cosine Transform is selected.

Generation of the MPEG Header

Bitstream headers, as defined in the MPEG2 Standard, contain information concerning the attached bitstream. The syntax of the header must be precise, as it is used to inform the decoder how to reconstruct the encoded picture. The usage of headers are application dependent. A flexible design is needed to allow easy adaptation to specific application requirements. Performance is also important so that valuable time is not taken away from the picture encoding.

In the encoder of our invention, a pre-loaded template is used in combination with a set of programmable instructions to generate the header bitstream. A 190×27 bits on-chip header buffer contains the templates for header types specified in the MPEG2 standard, MP@ML. This buffer is initialized from an external processor at the power on reset time.

Each header type occupies several entries in the buffer. The header generator of the invention contains a status register, writable by the processorof the invention, that works with the header buffer. The status register contains a bit for each header type. During the encoding process, the status register is modified with a data pattern indicating the header types needed. When a "ship header" command is issued, the header generator processes the status register from left to right, one bit at a time. When a bit is set to 1, the predefined header type is generated and shipped to the bitstream. The header is generated by processing the header buffer template entries associated with the header type.

Each entry in the header buffer contains the following fields:

1. valid,
2. length,
3. command, and
4. data.

During initialization all valid bits are set "off". The valid bit is only set by microcode when the associated data is needed in the bitstream per application. During "ship header" processing the contents of the "data" field are put into the bitstream if the "valid" field is "on".

The "length" field is loaded during the initialization process. It is used to indicate the length of data in the "data" field to be shipped to the bitstream when the "valid" bit is "on".

There are three bits in the "command" field. The "command" field is used to inform the header generator of the processor of the location of data, how to generate the data, and how much data to be inserted into the bitstream. The "command" codes are defined as follows:

001 ship content of data field into bitstream 010 concatenate 20 bits of zeros with the content of data field & ship into bitstream 011 ship next 64 bytes of data in data buffer into bitstream 100 ship macroblock data into bitstream 101 ship content of two consecutive data entries into the bitstream 110 ship content of data field into bitstream and reset valid bit 111 ship user data into bitstream The 000 code is undefined Contents of data field is initialized by the external processor. It can later be modified by microcode.

The content of the header buffer is writable by either the external or the internal processor. This provides flexibility. The internal processor, that is, the processor of the invention, only has to set up a few registers when the ship header command is issued. The processor is freed to process other work while the header hardware builds and ships the header into the bitstream, thus improving performance.

Memory Organization

Temporal redundancies are redundant image information over time, i.e., data that is similar or repeats itself from frame to frame over time. Motion estimation is a process used to reduce temporal redundancies of video images. Motion estimation is a process of determining the movement of objects within an image sequence. Removal of temporal redundancies is also a key part of the MPEG2 standard. However the standard does not specify the method to accomplish Motion Estimation. The MPEG2 standard only specifies the headers, bit stream architecture, and protocols necessary to allow MPEG2 compliant decoding.

Motion estimation creates three challenges for the encoder: memory bandwidth, computation requirement, and noise. According to our invention, regional block matching is used for motion estimation. Regional block matching involves segmentation of a frame into smaller regions and searching for the displacement which produces a best match among possible regions in a reference frame. The size of a frame is defined as 720 rows of pixels horizontally by 480 lines of pixels vertically as defined in the MPEG2 standard. Since the amount of data per picture is too large to be included inside the encoder chip, it is stored in an external memory. Three main steps are required for motion estimation function: data retrieval from memory, data computation, and prediction selection.

The amount of data retrieved from external memory is directly proportional to the search window. A large search window provides a high probability of finding a closer match within a large amount of data, and therefore creates a bigger demand on memory bandwidth. The opposite is true for a small search window, which creates less of a demand on memory bandwidth, but has a lower probability of finding a closer match.

To maximize memory bandwidth, the encoder memory control system and method of the invention include luminance and chrominance pair (uv pair) storing, separate luminance and chrominace locations, memory access prioritization and physically distinct memories for luminance and chrominance.

Luminance and chrominance data are stored in separate locations. Motions occur in both luminance and chrominance data. However luminance and chrominance movements track each other. To minimize computation requirements, only luminance data is used in motion estimation. When pixel data is retrieved from external memory, the memory access time depends on Column Address Select (CAS) and Row Address Select (RAS) times. Longer delays are needed for each new RAS access than an adjacent CAS within a RAS. For this reason, the luminance data is stored separately from the chrominance data. This maximizes adjacent CAS during motion estimation. The chrominance data is sent to the memory control in UV pairs and is stored and fetched from the DRAM in this manor to save memory bandwidth when processing a picture store or a macroblock (MB) fetch.

As defined in the MPEG2 standard, a picture is divided into smaller subimages or macroblocks. The macroblocks are coded independently of one another. A macroblock is defined as 16 pixels horizontally and 16 lines vertically. It is further defined that the pel unit in the macroblock could either be full or half pel. Let x and y be adjacent pixels in a picture, half pel is defined as $$(x + y)/2$$
where / is a division with rounding To form 16 pixels in half unit, the encoder has to retrieve 17 bytes from external memory. With an input memory bus design four bytes wide, five memory accesses are needed to retrieve 17 bytes of data. However, only 1 byte in the last access is useful. This applies to luminance and chrominance data (u and v). By storing the u and v in pairs, only nine memory accesses are needed for 1 line of chrominance data. By way of comparison, ten memory accesses are needed if Luminance and chrominance (u and v) are stored in separate memory locations.

In the encoder, the input images are accumulated until enough data is saved to start encoding. Data is then fetched from the external memory during the encoding process. The image is reconstructed from the encoded data. This reconstructed image is also saved in external memory. The reconstructed image in external memory will then be retrieved later as reference data for motion estimation in subsequent pictures. A piece of pixel data is stored and fetched several times during the encoding process. To minimize conflicts, the external memory in the encoder of the invention is physically separated into different segments. Each segment has its own controls and data path such that several memory segments can operate simultaneously. The segments are selected based on their data flow in the encoder. The input image is saved in one memory segment and the reconstructed image is saved in another memory segment.

When performing the task of fetching and storing reconstructed reference data, the DRAM saves bandwidth by prioritizing the memory accesses. The encoding parameters for the picture, such as picture type, IP or IPB mode, dual prime, and the number of reference fields, help to predict the number of fetches each unit in the refinement search path will have per macroblock. With the number of fetches per unit predicted, the memory control executes a DRAM fetch and store pattern for that picture. Patterns for all of the different encoding scenarios are predetermined and mapped into a state machine to provide maximum data flow through the chip. Maximum data flow is achieved by mapping out DRAM fetches and stores so that each unit may receive data when it will need it, and the reference data is stored back to DRAM when it has been determined that the refinement units will be busy with previously fetched data. Memory accesses are streamlined as much as possible to prevent pauses in processing a macroblock due to units having to wait for the memory control to finish another fetch or a macroblock store before receiving their data.

The combination of the above features maximizes the bandwidth and miminizes the memory requirement for our encoder design.

While the invention has been described with respect to certain preferred embodiments and exemplifications, it is not intended to limit the scope of the invention thereby, but solely by the claims appended hereto.

We claim:

1. In a method of discrete cosine transform compression of a digital video image, the improvement comprising compressing the digital video image in a processor having four parallel ALUs for carrying out four calculations in one cycle, and further comprising the steps of:

(a) calculating field variance and frame variance of a macroblock, where
      (1) the field variance is the summation of field1 variance and field2 variance, where
         (i) the field1 variance is the summation of the absolute differences between all pairs of 2n+1 and 2n+3 lines in a frame structure calculated by subtract absolute and add accumulator instructions, wherein n is an even positive integer and
         (ii) the field2 variance is the summation of the absolute differences between all pairs of 2m+2 and 2m+4 lines in the frame structure calculated by subtract absolute and add accumulator instructions, wherein m is an even positive integer; and
      the processor either
         (i) first addresses two vertically adjacent pixels on consecutive odd field lines and then switches to consecutive even field lines, or
         (ii) first addresses two vertically adjacent pixels on consecutive even field lines and then switches to consecutive odd field lines;
      (2) the frame variance is calculated by summation of the absolute differences between adjacent lines in the frame structure calculated by subtract absolute and add accumulator instructions, individual pixels thereof being addressed by the processor as two vertically adjacent pixels on consecutive odd and even field lines in the macroblock;

(b) performing field discrete cosine transform compression of the macroblock when the field variance of the macroblock is less than the frame variance of the macroblock; and (c) performing frame discrete cosine transform compression of the macroblock when the frame variance of the macroblock is less than the field variance of the macroblock.

* * * * *